June 9, 1931. J. A. GUERIN, SR., ET AL 1,809,294
COFFEE PERCOLATOR
Filed Oct. 15, 1928
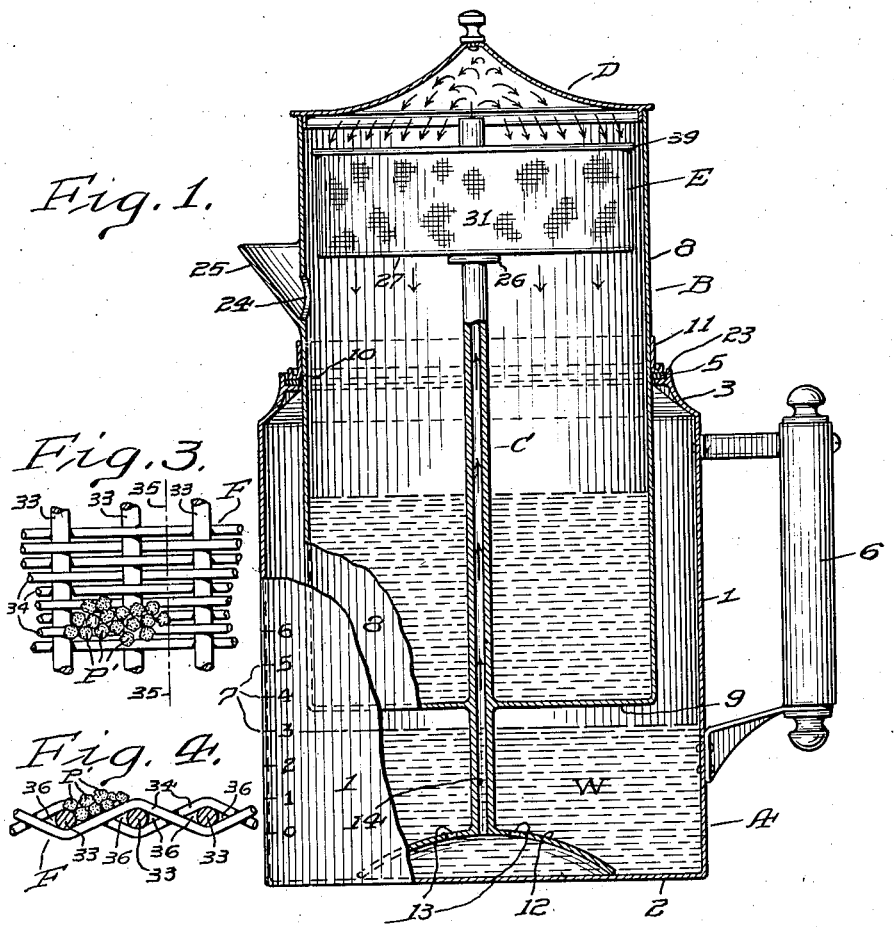
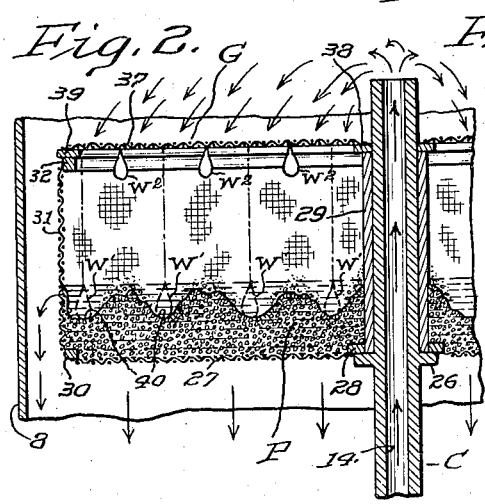
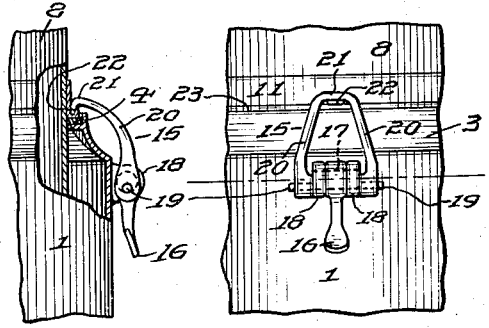
INVENTORS
Joseph A. Guerin, Sr.
James M. Guerin.
ATTORNEY Patented June 9, 1931

1,809,294

UNITED STATES PATENT OFFICE

JOSEPH A. GUERIN, SR., AND JAMES M. GUERIN, OF PHILADELPHIA, PENNSYLVANIA

COFFEE PERCOLATOR

Application filed October 15, 1928. Serial No. 312,597.

Our invention relates to certain improvements in percolators for the preparation of coffee beverages and the objects of our invention are to so construct and arrange the parts of a percolator that an infusion of finest quality may be invariably obtained without the exercise of any particular care or attention on the part of the one using the device, once the proper amount of water and pulverized coffee have been placed therein.

A further object of our invention is to make possible the use of pulverized coffee in a percolator similar to those in which unpulverized coffee is used, and to treat said pulverized coffee similar to the way in which French drip coffee is prepared, i. e., by passing the hot water through it but once, except that in using a pot embodying the present invention, the hot water is slowly and automatically supplied to the pulverized coffee in drops which fall a substantial distance to the upper surface of the loose pulverized coffee and which are distributed fairly evenly over the entire upper surface of the coffee.

A further object of our invention is to provide a percolator with a rectilinear container or basket for pulverized coffee which is operative to prevent the minute particles of pulverized coffee from passing therethrough and which is also operative to temporarily retain some of the water delivered thereto from the water elevator, to produce in the basket a plashy mobile mass of wet pulverized coffee which is kept in a state of agitation or movement by the continual dropping of fresh hot water thereon.

A further object of our invention is to provide a percolator with a basket or container for pulverized coffee which shall retain substantially all of the minute particles of pulverized coffee within the basket or retainer and which will permit of the coffee infusion to freely pass through those parts of the basket which are not covered with coffee particles.

A further object of our invention is to provide a simple device, having no small or moving parts which are liable to become disarranged and misplaced and wherein all the surfaces are accessible and readily kept clean and sanitary.

Further objects of our invention will appear in the specification and claims below.

In the drawings forming a part of the specification, the same reference characters are employed throughout the various views to designate the same parts, Fig. 1, in the main, is a vertical sectional view through the assembled percolator, portions of the circular walls of the boiler and of the pot being shown in elevation for the purpose of showing the manner in which the required amount of water may be indicated on the boiler.

Fig. 2 is a vertical sectional view on a larger scale of a portion of the coffee container or basket, of the water distributor and of the upper end of the elevator tube on which the basket is supported, and showing, in a somewhat conventional manner how the pulverized coffee is agitated and splashed during the operation of the device, by the water dripping thereon.

Fig. 3 is an elevational view, on a greatly magnified scale, of a fragment of the fine, closely woven wire fabric of Monel metal, of which the coffee container or basket is made.

Fig. 4 is a fragmentary view on the same magnified scale as Fig. 3 showing the manner in which the minute particles of pulverized coffee tend to retard the passage of water therethrough, when the device is operating, and showing why it is that the said minute solid particles do not completely close the passages through the fabric.

Fig. 5 is a fragmentary view of the sides of the boiler or water container and coffee pot, showing the clamp for drawing the pot tight down on its seat on the boiler or water container, and Fig. 6 is a front elevational view of one of the two clamps shown in Fig. 5 and with which the device is preferably provided.

The percolator forming the subject-matter of this invention, comprises a hot water container or boiler A, having preferably a vertical cylindrical wall 1, a flat circular bottom 2 and an inwardly and upwardly extending flange 3 at the top end thereof, providing an opening of smaller diameter than that of the boiler, through which passes the pot B. Said boiler A is provided with an annular seat 4 adapted to support a gasket or washer 5 upon which the pot is seated when the device is being assembled for use. The boiler A is also preferably provided with a handle 6 and with a series of graduations or other suitable indications 7 to indicate the amount of water to be placed in the boiler for the preparation of the quantity of coffee desired.

The pot or liquid coffee container B is also preferably provided with a vertical cylindrical outer wall 8 and with a flat bottom 9. The diameter of the pot B is preferably a little smaller than the opening at the top of the boiler A so that it may slip readily vertically therethrough until the seat 10, formed on the underside of a band 11 surrounding and rigidly secured to the pot, rests upon the upper surface of the gasket 5. The pot B is provided with an axially disposed tube or water elevator C which is preferably integral or unitary with the bottom 9 of the pot B and extends upwardly to substantially the level of the top edge thereof. The lower end of this tube C is preferably provided with a dome 12, the lower edge of which rests squarely against the bottom 2 of the boiler. Around and near the juncture of the dome 12 and the tube C, the former is provided with a series of perforations or holes 13 to permit of the entry of water from the pot into the dome, which, with the bottom 2, forms a chamber within which the steam, which elevates the water through the bore 14 of the tube C, is generated. The top of the pot B is preferably closed by a lid or cover D preferably somewhat conical in shape, so as to provide a chamber within which the water elevated through the tube C may be deflected and thrown downwardly to the basket F, containing the pulverized coffee P.

The boiler A is preferably provided on opposite sides with clamping hooks 15, one of which is shown in Figs. 5 and 6, and which may comprise a handle 16 rigidly secured to a shaft 17 journaled in a pair of lugs 18—18 rigid with the side of the boiler. The ends of the shaft 17 are preferably provided with a pair of eccentric pins 19, 19, one on each end, and over which are fitted the downwardly extending arms 20, 20 of a loop 21, the upper end of which is provided with a hook 22 adapted to take over the edges of an annular upwardly extending peripheral flange 23 which may be formed integral with the band 11 at the outer edge of the seat 10.

In Figs. 5 and 6, the clamping hook 15 is shown in its locked position. It should be readily understood that to release the hook, one has merely to turn the handle 16 upwardly, thus rotating the shaft 17 in an anti-clockwise direction (Fig. 5) and raising the eccentric pins 19, 19, thus lifting the hook 22 above the flange 23 and permitting one to then swing the hook 15 in a clockwise direction (Fig. 5) on the cylindrical bearings formed by the eccentric pins 19, clear of the flange 23.

By the operation of these clamping hooks 15, the seat 10 of the pot may be drawn down hard on the gasket 5 to form a substantially steam-tight joint between the boiler and the pot. Above the band 11 the cylindrical wall 8 of the pot may be provided with a suitable opening 24 communicating with a spout or lip 25 by means of which the contents of the pot B may be poured.

The tube C is also preferably provided with a shoulder or flange 26 near the upper end thereof, forming a seat upon which the basket or container E of pulverized coffee P is mounted and supported on the tube C. The basket E is provided with a flat bottom 27 consisting of a flat circular sheet or disk of exceedingly fine closely-woven fabric, the threads of which are preferably of Monel metal. The center of the bottom 27 is provided with a hole and around this hole the inner edge of the fabric is secured, by soldering or any other suitable means, to a ring 28, which in turn is rigidly secured to a tube 29 loosely fitting over the upper end of the tube E. The outer circular edge of the flat bottom 27 is similarly secured to a ring 30.

The cylindrical wall 31 is also preferably made of a strip of this same fine wire fabric bent to cylindrical shape and the ends of said strip are soldered or otherwise secured together. The lower edge of said wall 31 is soldered or otherwise secured to the ring 30 and the upper edge is similarly secured to a ring 32. Thus, the tube 29, the rings 28, 30 and 32, the flat circular bottom 27 and the vertical cylindrical wall 31 together form a basket or recticular container for holding and retaining pulverized coffee P placed therein.

Referring to Figs. 3 and 4 wherein is shown a fragment of the fabric F of which the bottom and side walls of the basket are constructed and which, as above stated, is on a greatly enlarged scale, the warp threads 33 of the fabric and the weft threads 34 extend in directions at right angles to each other. The warp threads 33 are preferably spaced at a greater distance from each other than are the weft threads 34. Thus, the warp threads 33 may be spaced twenty to the inch and the weft threads 34 may be one hundred and twenty to the inch. The warp threads 33 are preferably of a slightly larger diameter than the weft threads 34 and the size of passages through the woven fabric F may be determined by the size of the warp threads.

We have shown in Fig. 3 the weft threads 34 spaced from each other by a distance which is less than the diameter of a particle of pulverized coffee. The said weft threads may however be beaten up so close to each other that where they cross on the line 35—35

(Fig. 3) they may be in physical contact. When two consecutive weft threads are beaten up into contact with each other the passage through the fabric F is the space 36 between two adjacent weft wires and at their point of contact and the warp wire. When they are spaced, as in Fig. 3, it is the substantially rectangular space between two adjacent weft threads and two adjacent warp threads. In this way, the actual width of the passage through the fabric F may be readily made substantially less than the least or smallest diametral dimension of the particles P' of pulverized coffee, and the said particles of pulverized coffee in the basket E cannot pass through the narrow passages thus provided through the woven wire fabric F, even though the length of the said passages is greater than the greatest diametral dimension of a coffee particle. By thus making the long dimension of these passages greater and the short dimension less than a coffee particle, the passage 36 can never become completely clogged or stopped by a single particle of pulverized coffee, and can never be completely closed by a plurality of particles, because the particles are separate and granular, and theoretically, at least, they are in physical contact with each other at a single point only, thereby providing space between the particles for the slow seepage of water therethrough, (see Fig. 3).

We prefer to close the top of the basket E with a cover and water distributor G comprising a flat disk 37 having an axially disposed hole therethrough, the inner edges of the fabric F around said hole being soldered or otherwise permanently secured to a ring 38 and the outer edge of the disk 37 being similarly secured to a larger metal ring 39 so that the inner ring 38 may be freely passed over the upper end of the tube or water elevator C to rest on the upper end of the tube 29 and the outer ring may rest on the top of the ring 32 at the top edge of the basket E. The cylindrical wall 31 of the basket is preferably substantially spaced from the vertical cylindrical wall 8 of the pot.

In making the side or cylindrical wall 31 of the basket E, we prefer to dispose the warp threads 33 vertically and the weft threads 34 horizontally or circumferentially of the basket so that the long dimension of the mesh of the fabric or of the passage 36 therethrough is circumferential and the short dimension thereof is vertical of the basket. In other words, the fabric F of the cylindrical wall 31 of the basket will be disposed with the warp threads 33 vertical, as they appear in Fig. 3.

To use the device, the pot B is removed from the boiler A and water W is placed in the boiler A sufficient for the amount of liquid coffee or infusion to be prepared. If one wishes to prepare four cups of coffee, the level of the water in the boiler should be at the numeral "4" of the graduations 7 in the wall of the boiler A. If one cup is desired, the level of the water should be at the mark "1". The quality of the coffee produced is the same whether one or six cups are to be prepared for the hot water passes but once through the coffee P in the basket E. After placing the water in the boiler A, the pot B is inserted into the boiler, the seat 10 of the pot B resting on the gasket or washer 5 which is in turn supported on the seat 4 of the boiler. The clamping hooks 15, and the handle 16 are then swung upwardly on their respective cylindrical bearings to bring the hook 22 against the outer surface of the band 11. Then the handle 16 is swung downwardly, drawing the hooks 15 downwardly, and tightly clamping the washer or gasket 5 between the seat 4 on the boiler and the seat 10 on the pot, thus making a steam tight joint between the boiler A and the pot B. The proper amount of pulverized coffee P is then placed in the basket E. The cover G is placed on the basket E and then the cover D is placed in the upper end of the pot B to close it. The device may then be placed upon the stove or gas burner. The slow application of heat to the water contained within the dome 12 generates steam which rises in bubbles and carries small quantities of water upwardly through the bore 14 of the tube C and projects such water in drops or short gushes against the inner side of the lid D whence the water is deflected downwardly against the disk or closure G of the basket E. The flow of water is intermittent, not continuous. The water, collecting in drops on the disk G falls then onto the pulverized coffee P within the basket E. As soon as the coffee becomes wet, and the water, seeping through the coffee, reaches the flat reticular bottom 27 of the basket, the small solid particles P' of pulverized coffee, carried with the water tend to fill and clog the very small passages 36 through the fabric F. While they cannot completely stop the flow of coffee through the bottom 27, because the passages are longer than the diameter of the particles of coffee as above described, they substantially check the flow of water through the bottom with the result that the amount of water that actually passes through the bottom 27 of the basket is relatively small as compared with that which is delivered to the basket from the tube C, and the contents of the basket E become very wet, mobile and plashy. The dropping of water from the cover D into this wet plashy mass of pulverized coffee, keeps the mass in constant agitation, thus giving the water a chance to absorb or dissolve a great deal of the flavor or taste of the pulverized coffee. As the quantity of water in the basket increases, it rises to a point above that where the particles of pulverized coffee are so closely packed against the sides of the fabric and this water so infused with the coffee freely passes out through the side walls of the basket and drips down on the outside of the basket into the pot B where it collects.

As the water falls in drops the mobile contents of the basket fly upward in all directions. In Fig. 2 we have indicated in dotted lines the fact that the drops W′ have fallen and have thrown up the mobile particles of coffee in the basket all around the place where the drop fell forming depressions 40. The drops $W^2$, are shown as suspended from the cover F, over the elevated parts of the upper surface of the plashy mass in the basket. When these drops $W^2$ fall, they will form depressions as the drops W′ did and the depressions 40 formed by the drops W′ will be filled with the plash formed by the drops $W^2$.

It is to be understood that this illustration is diagrammatic, but it serves to clearly explain the nature and character of the roiling, stirring, agitating and mixing of the mobile mass of coffee in the basket E; how the walls above the level of the plashy mass, as well as the cover F, serve to prevent the mass of coffee from splashing out of the basket, and how the basket provides a sufficient clear area of fine mesh fabric above the level of the coffee in the basket, through which the infusion of coffee, thus formed may readily flow and drop down into the pot below it.

The steam produced by the boiling of the water in the pot surrounds the lower part of the pot, is under a slight pressure and keeps the contents of the pot B at the temperature of boiling water or steam. No steam can escape through the connection between the pot A and the boiler B because of the tight clamping connection above described. Therefore, all the water and eventually all the steam generated therein will have to pass out through the bore 14 of the tube C.

In operating the device, the only care that it is necessary to exercise is to see to it that the water does not boil violently. A slow heat is sufficient to generate enough steam to project the water in drops or small globules up through the bore 14 against the inside of the lid D. The water should have ample opportunity to agitate the contents of the basket E and to abstract the flavor of the pulverized coffee therein.

After enough of the water has been thus discharged to expose or uncover the holes or perforations 13, no water will be forced thereafter through the tube C but only steam and the rush of steam through the tube gives the housewife or user of the device notice that the operation is complete and that all the water necessary for making the predetermined number of cups has been transferred from the boiler A to the pot B.

It will also be seen that it is impossible, in operating the device as above described, for one to boil or over-cook or under-cook the coffee and thereby spoil the product. The water passes but once through the coffee as in preparing French drip coffee. The continued boiling of the water, once the predetermined amount of water has been transferred from the boiler to the pot, does not cook the coffee. It merely maintains the contents of the pot at the temperature of steam. The coffee is kept hot but is not further cooked. Nor is the quality of the coffee varied by the quantity which is made at one time, only the necessary amount of water will be transferred from the boiler A to the pot B and if the proper amounts of coffee and water be placed in the coffee container E, then the resulting infusion will be uniform irrespective of quantity. The device is very simple; it has few parts; is easily cleaned; and it has no parts to get out of order or to become detached or lost. The operative parts are substantially all contained in the boiler and pot and the separable parts are but five in number.

The fine woven wire fabric of Monel metal is a fabric to which the coffee does not firmly adhere. It is readily cleaned or cleared by directing a stream of water against the outside of the basket, whereupon any small particles of pulverized coffee partly clinging to the mesh of the fabric is readily floated off and the basket is kept clean.

The cover or closure F for the basket E is for three purposes. (1) It distributes the water coming from the upper end of the tube somewhat evenly all over the upper surface of the pulverized coffee in the basket and (2) it provides a definite distance through which the drops may fall onto the coffee and to agitate the contents and to keep the contents of the basket turbid and roily, and (3) it prevents the minute particles of coffee from splashing up over the edge of the basket and falling into the pot. The spacing of the side walls of the basket E from the inner wall of the pot B is ample to allow the coffee passing through the side walls of the basket to flow down over the outside of the basket to the pot, but the space is well outside of the area over which the water, delivered from the tube C, is distributed by the curved underside of the lid D.

By the use of our invention above described, a perfectly clear and delightful infusion may be obtained in a percolator structure from pulverized coffee. The quantity of pulverized coffee used is relatively small. The basket is relatively large in diameter so that the layer of pulverized coffee in the basket is thin and the height of the basket is sufficient to make the distance through which the water falls to thoroughly agitate the contents of the basket as above described.

Having thus described our invention, what we claim and desire to protect by Letters Patent of the United States is:

1. In a percolator for infusing pulverized coffee, the combination of a boiler, a pot depending downwardly from the top of said boiler into said boiler and having its side walls spaced from the walls of said boiler, a basket mounted within the upper part of said pot and having its bottom and side walls made of closely woven wire fabric, the spaces between the warp threads of which are substantially greater than the greatest diameter of a particle of pulverized coffee and the spaces between the weft threads of which are smaller than the smallest diametrical dimension of a particle of pulverized coffee, said warp threads extending vertically in the side walls of said basket, and means extending from the bottom of the boiler upwardly to discharge water from said boiler intermittently into said basket faster than the infusion of coffee formed in said basket can seep through said coffee and pass through the walls of said basket to said pot.

2. In a percolator for infusing pulverized coffee, the combination of a boiler, a pot depending downwardly from the top of said boiler into said boiler and spaced from the walls thereof, a basket mounted within the upper part of said pot, the side walls of said basket being made of a closely woven fabric, the spaces between the threads of which, in one direction of the fabric, being considerably greater than the greatest diametrical dimension of a particle of pulverized coffee and between the threads extending at right angles to said first mentioned threads, being less than the smallest diametrical dimension of said particles of pulverized coffee, and means to discharge water upwardly from the bottom of said boiler into the top of said basket faster than an infusion of coffee so formed in said basket can seep through said pulverized coffee and pass through said fabric to said pot.

In witness whereof, we have hereunto set our hands this 11th day of October, 1928.

JOSEPH A. GUERIN, Sr.
JAMES M. GUERIN.